UNITED STATES PATENT OFFICE.

DAVID BLOCHER AND WILLIAM MARKHAM, OF TIDIOUTE, PENNSYLVANIA; SAID MARKHAM ASSIGNOR TO SAID BLOCHER.

IMPROVEMENT IN MEDICAL COMPOUNDS OR SALVES.

Specification forming part of Letters Patent No. 149,188, dated March 31, 1874; application filed January 20, 1874.

*To all whom it may concern:*

Be it known that we, DAVID BLOCHER and WILLIAM MARKHAM, of Tidioute, in the county of Warren and State of Pennsylvania, have invented a new and Improved Salve; and that the following is a full, clear, and exact description of the same.

This invention has for its object the production of a salve; and the invention consists in a salve made from the residuum of crude petroleum, substantially as hereinafter described.

It is well known that in the bottoms of the tanks wherein is stored crude petroleum direct from the wells a deposit accumulates, consisting of paraffine and heavy oleaginous substances.

We take this substance and submit it to the direct action of live steam under high pressure for forty-eight hours, after which the steam is turned off and the substance allowed to settle in the bottom of the vessel, when it is subjected to the action of dry heat for twenty-four hours, which drives out all the water from the substance, and the salve is at once ready for use.

The salve produced as above described is believed to be a specific for the cure of piles, burns, scalds, cuts, chafes, and chapped hands, besides being valuable when applied to wounds, cuts, and bruises.

Having thus described our invention, what we claim as new, and desire to secure by Letters Patent, is—

A salve made from the residuum of crude petroleum by subjecting it to the action of live steam, and afterward to dry heat, substantially as described.

DAVID BLOCHER.
WM. MARKHAM.

Witnesses:
SCOTT ALLEN,
J. G. LEE.